United States Patent
Tokunaga et al.

(10) Patent No.: US 6,636,378 B2
(45) Date of Patent: Oct. 21, 2003

(54) PRESSURE SENSITIVE ADHESIVE LABEL FOR HARD DISC DRIVE AND METHOD FOR REDUCING GENERATION OF SOUND AT THE TIME OF DRIVING HARD DISC DRIVE USING PRESSURE SENSITIVE ADHESIVE LABEL

(75) Inventors: Yasuyuki Tokunaga, Ibaraki (JP); Naoyuki Nishiyama, Ibaraki (JP); Yasunori Sugihara, Ibaraki (JP); Hideyuki Kitai, Ibaraki (JP); Masahiro Ohura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/980,626

(22) PCT Filed: Mar. 30, 2001

(86) PCT No.: PCT/JP01/02731
§ 371 (c)(1),
(2), (4) Date: Dec. 4, 2001

(87) PCT Pub. No.: WO01/75889
PCT Pub. Date: Oct. 11, 2001

(65) Prior Publication Data
US 2002/0181147 A1 Dec. 5, 2002

(30) Foreign Application Priority Data
Apr. 4, 2000 (JP) .......................... 2000-102757
Mar. 16, 2001 (JP) .......................... 2001-076140

(51) Int. Cl.$^7$ .............................................. G11B 17/02
(52) U.S. Cl. ................................................... 360/97.01
(58) Field of Search ............................ 360/97.01, 99.12

(56) References Cited

U.S. PATENT DOCUMENTS

| | | | |
|---|---|---|---|
| 6,229,668 B1 * | 5/2001 | Huynh et al. | ............ 360/97.01 |
| 6,266,207 B1 | 7/2001 | Iwahara et al. | |
| 2001/0009486 A1 | 7/2001 | Iwahara et al. | |

FOREIGN PATENT DOCUMENTS

| | | |
|---|---|---|
| JP | 7-196992 A | 8/1995 |
| JP | 10-233086 A | 9/1998 |
| JP | 11-232833 | 8/1999 |
| JP | 11-232862 A | 8/1999 |

* cited by examiner

*Primary Examiner*—Robert S. Tupper
(74) *Attorney, Agent, or Firm*—Birch, Stewart, Kolasch & Birch, LLP

(57) ABSTRACT

A pressure sensitive adhesive label for a hard disk drive includes a substrate, an information indicator formed on one side of the substrate, and a pressure sensitive adhesive layer formed on the other side of the substrate. By applying onto the outer surface of a housing of a hard disk drive, the pressure sensitive adhesive label can reduce noise caused by operation of the hard disk drive.

The pressure sensitive adhesive label for a hard disk drive can concurrently exhibit various information indicating functions and the function of reducing noise caused by operation of a hard disk drive. By using the pressure sensitive adhesive label, a method can reduce noise caused by operation of a hard disk drive.

15 Claims, 1 Drawing Sheet

PRESSURE SENSITIVE ADHESIVE LABEL FOR HARD DISC DRIVE AND METHOD FOR REDUCING GENERATION OF SOUND AT THE TIME OF DRIVING HARD DISC DRIVE USING PRESSURE SENSITIVE ADHESIVE LABEL

This application is the national phase under 35 U.S.C. §371 of PCT International Application No. PCT/JP01/02731 which has an International filing date of Mar. 30, 2001, which designated the United States of America.

TECHNICAL FIELD

The present invention relates to a pressure sensitive adhesive label for a hard disk drive, which is applied onto the outer surface of a housing of the hard disk drive. Specifically, it relates to a pressure sensitive adhesive label for a hard disk drive, which can exhibit various display functions as a pressure sensitive adhesive label and can reduce noise caused by operation of a hard disk drive.

BACKGROUND ART

With regard to hard disk drives for consumer use such as in personal computers, the miniaturization of such hard disk drives and reduction in noise of operation of the hard disk drives are just as important as increasing of the storage capacity.

Noise caused by operation of a hard disk drive is generally reduced by constituting part of a housing (e.g., a cover) of the hard disk drive with a vibration-damping sheet steel.

SUMMARY OF THE INVENTION

However, especially in a hard disk drive containing a recording disk platter having a diameter of less than or equal to 2.5 inch, the aforementioned technique using the vibration-damping sheet steel is still insufficient in miniaturization, weight reduction, productivity and cost and should be further improved.

The present invention has been accomplished under these circumstances, and an object of the present invention is to provide a novel means for reducing noise caused by operation of a hard disk drive, which can further reduce the noise instead of, or in addition to, the conventional means for reducing the noise using the vibration-damping sheet steel.

After intensive investigations to solve the above problems, the present inventors have found that the problems can be solved by imparting the function of reducing noise caused by operation of a hard disk drive to a pressure sensitive adhesive label that is applied onto the outer surface of a housing of the hard disk drive and has various information indicating functions. The present invention has been accomplished based on these findings.

Specifically, the present invention relates to a pressure sensitive adhesive label for a hard disk drive, including a substrate, an information indicator formed on one side of the substrate, and a pressure sensitive adhesive layer formed on the other side of the substrate, in which the pressure sensitive adhesive label can reduce noise caused by operation of a hard disk drive by applying the label onto the outer surface of a housing of the hard disk drive. In addition, the present invention relates to a method of reducing noise caused by operation of a hard disk drive, the hard disk drive including a box-shaped housing main body for housing a recording disk platter and a top cover matching with the housing main body. The method includes the step of applying the aforementioned pressure sensitive adhesive label for a hard disk drive onto the outer surface of the top cover and/or of the housing main body of a hard disk drive.

BEST MODE FOR CARRYING OUT THE INVENTION

Figure 1:
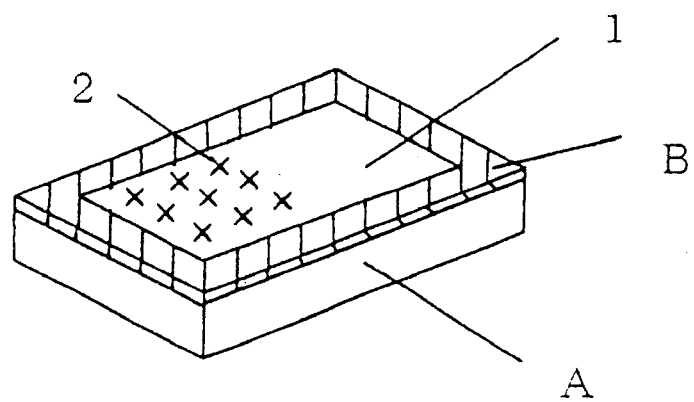
FIG. 1 is a schematic diagram of an embodiment of a method of reducing noise caused by operation of a hard disk drive using a pressure sensitive adhesive label according the present invention.

The present invention will be described in detail with reference to the attached drawings. FIG. 1 is a schematic diagram of an embodiment of a method of reducing noise caused by operation of a hard disk drive (hereinafter may briefly be referred to as "operation noise") using a pressure sensitive adhesive label for a hard disk drive (hereinafter may briefly be referred to as "pressure sensitive adhesive label") of the present invention. With reference to FIG. 1, a hard disk drive comprises a housing main body A and a top cover B. The housing main body houses a recording disk patter, a magnetic head, a spindle motor and other components. A pressure sensitive adhesive label 1 having an-information indicator 2 on its surface (backside) is applied onto the outer surface of the top cover B.

The pressure sensitive adhesive label for use in the present invention is one that can reduce operation noise by applying the same onto the outer surface of a housing (e.g., the top cover or housing main body in FIG. 1) of a hard disk drive. The phrase "can reduce noise caused by operation of a hard disk drive" as used herein means that the adhesive label in question can reduce 1 dB or more of the operation noise.

In addition, the pressure sensitive adhesive label has an information indicator on the surface (backside) of a substrate. Such information includes "cautions in use", "connection method", "identifying information such as product name and manufacturer name". By this configuration, the pressure sensitive adhesive label can have the function of reducing operation noise and thereby can further reduce noise of the hard disk drive, while a conventional pressure sensitive adhesive label only has the function of information indication. In addition, one and the same member can provide this configuration according to the present invention, whereas it could only be achieved by two members, i.e., a vibration-damping sheet steel and a pressure sensitive adhesive label, according to the conventional technique.

Figure 2:
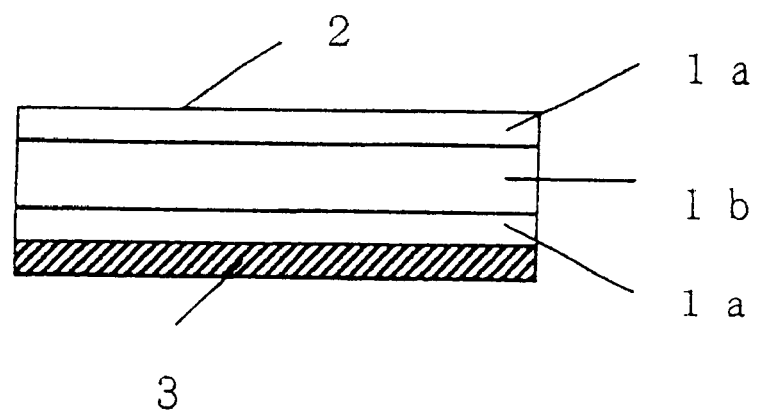
FIG. 2 is a schematic sectional view of a pressure sensitive adhesive label as an embodiment of the present invention.

The pressure sensitive adhesive label for use in the present invention is not specifically limited in concrete configuration, as long as it has the above functions. With reference to FIG. 2, the substrate (base) of the pressure sensitive adhesive label is preferably a laminated substrate comprising at least three layers including a metal foil 1b and resin film layers 1a formed on both sides of the metal foil 1b. The resin film layers 1a may be resin films each comprising a resin. Such resins include, for example, poly(ethylene terephthalate) (PET), poly(butylene terephthalate) (PBT), polyimide (PI), polyethylene (PE), and polypropylene (PP), of which poly(ethylene terephthalate) is typically preferred from the viewpoints of cost efficiency and durability. As the metal foil 1b, metal foil such as aluminium foil, iron foil, stainless steel foil, nickel foil or copper foil can be used. Among them, aluminium foil is typically preferred from the viewpoints of processability and cost efficiency.

The pressure sensitive adhesive label of the present invention should have such rigidity that can exhibit vibration-damping property and should have satisfactorily-operability in application as a pressure sensitive adhesive label. From these points, the thickness or configuration of each layer of the resin film layer/metal foil/resin film layer of the substrate may for example be the following thickness or configuration.

(1) The thickness of the resin film layer on the backside of the pressure sensitive adhesive label, on which the information indicator is formed, is generally from 6 μm to 125 μm inclusive and preferably from 25 μm to 125 μm inclusive. If the resin film layer has a thickness of less than 6 μm, the entire substrate is affected by the characteristics of the metal foil and is liable to be wrinkled. Additionally, the resulting layer is very thin and cannot significantly be laminated stably.

When the resin film layer has a thickness of equal to or more than 25 μm, imperfect printing can further be avoided or improved when the information indicator is formed on the surface of the resin film layer constituting the backside of the pressure sensitive adhesive label by a thermal transfer printing means. Such imperfect printing is supposed to be caused by heat that is generated during ink transfer and is dispersed through the metal foil.

When the information indicator is formed by printing, for example, a bar code, a white or another colored resin film (e.g., a white poly(ethylene terephthalate) film) is advantageously used in the resin film layer. By this configuration, the resulting pressure sensitive adhesive label has an improved capability of reading the bar code.

(2) From the viewpoint of ensuring rigidity as the substrate, the thickness of the metal foil is preferably equal to or more than 10 μm and preferably from 15 to 150 μm. If the metal foil has a thickness of less than 10 μm, the rigidity of the substrate may not sufficiently be increased in some cases. To increase the rigidity of the substrate, the more the thickness is, the better. However, if the metal foil is excessively thick, the resulting pressure sensitive adhesive label becomes excessively thick and thereby affects the thickness of the product hard disk drive. Accordingly, the thickness of the metal foil is preferably less than or equal to 150 μm.

(3) The other resin film layer formed on the other side, on which the pressure sensitive adhesive layer is formed, is laminated mainly in order to prevent the pressure sensitive adhesive label from curling. To reduce the total thickness of the pressure sensitive adhesive label, the thickness of this resin film layer is preferably minimized and is generally from 6 μm to 50 μm inclusive and preferably from 6 μm to 25 μm inclusive, while depending on the thickness of the metal foil layer.

The substrate can be produced by laminating the metal foil and resin film layers by a conventional lamination means such as dry lamination.

Additionally, printing quality of the label and anchoring property of the pressure sensitive adhesive can be improved by subjecting one or two of the resin films of the substrate to surface treatment using a conventional means such as a corona treatment and a treatment for increased adhesion.

The information indicator 2 is formed on one side (backside) of the substrate. On this information indicator, sin information such as "cautions in use", "connection method", "identifying information such as product name and manufacturer name" can be formed, for example, by a conventional printing means.

An pressure sensitive adhesive layer 3 is formed on the opposite side of the substrate to the side on which the information indicator is formed. An pressure sensitive adhesive constituting the pressure sensitive adhesive layer can appropriately be selected from known pressure sensitive adhesives such as synthetic rubber pressure sensitive adhesives, natural rubber pressure sensitive adhesives and acrylic pressure sensitive adhesives. Among them, acrylic pressure sensitive adhesives are preferred from the viewpoint of durability. Specifically, pressure sensitive adhesives composed of polymers mainly containing a (meth)acrylate containing an alkyl group having from 4 to 14 carbon atoms is preferred. Such (meth)acrylates each containing an alkyl group having from 4 to 14 carbon atoms include, but are not limited to, alkyl esters of (meth)acrylic acid containing an alkyl group such as butyl group, 2-ethylhexyl group, octyl group, isononyl group, hexyl group, isoamyl group, lauryl group and isomyristyl group.

In the present invention, an acrylic pressure sensitive adhesive composed of a polymer containing a (meth) acrylate containing an alkyl group having from 7 to 10 carbon atoms and acrylic acid as comonomer components can advantageously be used as the acrylic pressure sensitive adhesive. By using this type of polymers, a satisfactory glass transition temperature and adhesion properties of the pressure sensitive adhesive can concurrently be obtained. The glass transition temperature greatly contributes to vibration-damping property.

The vibration-damping property of the pressure sensitive adhesive layer is greatly affected by the glass transition temperature of the pressure sensitive adhesive. To effectively exhibit the characteristic of the pressure sensitive adhesive layer at an operating temperature (specifically, an operating temperature of the hard disk drive and is generally room temperature or higher), the loss factor of the pressure sensitive adhesive constituting the pressure sensitive adhesive layer at 20° C. is preferably from 0.5 to 2.0 inclusive and more preferably from 0.7 to 2.0 inclusive. In addition, the peak temperature of the loss factor of the pressure sensitive adhesive is preferably from −10° C. to 50° C. inclusive. By controlling the loss factor and/or the peak of the loss factor of the pressure sensitive adhesive within the above range, the resulting pressure sensitive adhesive can concurrently have vibration-damping property and adhesion property at high levels.

The thickness of the pressure sensitive adhesive layer is not specifically limited and is generally equal to or more than 15 μm and preferably from 20 to 100 μm inclusive, from the viewpoint of reducing effect of operation noise.

A release liner may be used in the pressure sensitive adhesive label of the present invention to protect the same before use. In this connection, a silicone component, if any, in a release liner transfers or migrates onto the surface of pressure sensitive adhesive layer and may cause malfunctions such as contact faults in hard disk drives and other precision electronic equipment. To prevent these malfunctions, a release liner containing less amount of the silicone component is preferably used as the release liner. Among them, a release liner containing no silicone release agent as the release agent is typically preferred. Such release liners containing no silicone release agent as the release agent include, for example, release liners each comprising a substrate and a release agent layer formed on the substrate, which release agent is a fluorine release agent or a longchain alkyl release agent other than the silicone release agent; and plastic films that have high release property, such as polyethylene films and ethylene-α-olefin copolymer films.

When a release liner containing less amount of the silicone component that transfers to the surface of the pressure sensitive adhesive layer is used or a release liner containing no silicone release agent as the release agent is used, the release liner often exhibits a larger peel force than a release liner containing the silicone release agent. As a result, the pressure sensitive adhesive label of the present invention curls in some cases when it is peeled off from the release liner. Accordingly, the substrate of the pressure sensitive adhesive label is preferably a laminated substrate comprising at least three layers including the metal foil and the resin film layers formed on both sides of the metal foil. By using a pressure sensitive adhesive label using the substrate of this configuration and the release liner containing no silicone release agent as the release agent, the resulting pressure sensitive adhesive label can be prevented from curing when it is peeled off from the release liner before use and the pressure sensitive adhesive label can more efficiently be applied to a hard disk drive.

A method of the present invention reduces noise caused by operation of a hard disk drive by applying the pressure sensitive adhesive label of the present invention onto the outer surface of, for example, a top cover and/or a housing main body (casing) of the hard disk drive. The hard disk body may comprise, for example, the housing main body A and the top cover B, which housing main body A houses a recording disk platter, a magnetic head, a spindle motor and other components, as shown in FIG. 1. According to the present invention, the pressure sensitive adhesive label may be applied to at least part of the casing of the hard disk drive. To further effectively reduce the operation noise, the pressure sensitive adhesive label should preferably be applied so as to cover a larger area. Most preferably, the pressure sensitive adhesive label is applied onto the surface of the top cover of the hard disk drive SQ as to cover equal to or more than 20%, and typically preferably from 25% to 100% of the total area of the top cover.

By this configuration, the pressure sensitive adhesive label of the present invention can concurrently have various information indicating functions as a pressure sensitive adhesive label and the function of reducing noise caused by operation of a hard disk drive.

Accordingly, the pressure sensitive adhesive label of the present invention, which is used in the method of reducing noise caused by operation of a hard disk drive, can concurrently have satisfactory information indicating functions as a pressure sensitive adhesive label and the function of reducing operation noise as a sound-insulating and vibration-damping material. The pressure sensitive adhesive label of the present invention can therefore improve cost efficiency and operation efficiency as a pressure sensitive adhesive member for a hard disk drive having two types of functions (effects) of the member as a pressure sensitive adhesive label and as a sound-insulating and vibration-damping material. Such reduction in noise caused by operation of a hard disk drive has become increasingly valued in recent years.

The present invention will be illustrated in further detail with reference to several examples below, which are not intended to limit the scope of the invention.

EXAMPLE 1

The following substrate A is used as the substrate.

Substrate A: The substrate A was prepared by dry lamination bonding and included a poly(ethylene terephthalate) film layer (thickness: 9 μm)/aluminium foil (thickness: 30 μm)/a poly(ethylene terephthalate) film layer (thickness: 9 μm).

The following pressure sensitive adhesive composition A was used as the pressure sensitive adhesive.

Pressure sensitive adhesive composition A: In a three-neck flask, 15 parts by weight of acrylic acid and 85 parts by weight of isononyl acrylate as components, and 0.1 part by weight of a photosensitive initiator (available from Ciba Geigy Ltd., under the trade name of "Irgacure 184") were placed, the resulting mixture was stirred for 1 hour while introducing the nitrogen gas into a reaction system, and the inside atmosphere of a reaction system was replaced with the nitrogen gas. Subsequently, the mixture was irradiated with ultraviolet rays from an ultraviolet lamp (UV lamp) to an exposure of about 150 mJ to perform a reaction with a polymerization rate of about 10% and thereby yielded a prepolymer. To 100 parts by weight of the prepolymer, 0.2 part by weight of trimethylolpropane triacrylate (TMPTA) as an internal cross-linking agent was added, the resulting mixture was stirred and thereby yielded a pressure sensitive adhesive composition A (an acrylic pressure sensitive adhesive A).

The above-prepared pressure sensitive adhesive composition A (acrylic pressure sensitive adhesive A) was applied onto one side of the substrate A to a thickness of 25 μm. Onto the surface of the applied composition A, a silicone release layer, which was formed on a polyethylene terephthalate) film and thereby constituted a release liner A, was affixed to cut off the surface of the composition from an airspace. Under this condition, the resulting laminate was irradiated with ultraviolet rays at an exposure of about 2000 mJ using an UV lamp from the release liner layer side, was allowed to react and thereby yielded an pressure sensitive adhesive sheet A. After peeling off (or removing) the release liner A from the pressure sensitive adhesive sheet A, the pressure sensitive adhesive layer composed of the acrylic pressure sensitive adhesive A was dried in an oven at 130° C. for about 1 minute to remove volatile components therefrom. The silicone release agent layer of the release liner A was then applied again onto the surface of the pressure sensitive adhesive layer and thereby yielded a pressure sensitive adhesive sheet A carrying the substrate.

The backside of the substrate of the above-prepared pressure sensitive adhesive sheet A carrying the substrate was subjected ro printing and thereby yielded a pressure sensitive adhesive label A.

The above-prepared pressure sensitive adhesive label A was applied onto the outer surface of a top cover of a commercially available 2.5-inch hard disk drive (a) so as to cover about 56% of the to cover and was subjected to measurement of a noise level according to [Measuring Method of Noise Level (Operation noise)] mentioned later. The results are shown in Table 1. In Table 1, the noise level [dB (A)] of the hard disk drive before the application of the pressure sensitive adhesive label is indicated in the column of "Noise level before application of adhesive label [dB (A)]", and the noise level [dB (A)] of the hard disk drive after the application of the pressure sensitive adhesive label is indicated in the column of "Noise level after application of adhesive label [dB (A)]". Table 1 shows that the noise level of 27.7 dB (A) before the application of the pressure sensitive adhesive label A according to Example 1 was reduced to 25.8 dB(A) after the application.

In addition, the loss factor (tan δ) of the pressure sensitive adhesive (acrylic pressure sensitive adhesive A) and the temperature at the peak of the loss factor of the pressure sensitive adhesive (peak temperature of the loss factor) were determined in accordance with [Measuring method of loss factor] mentioned later. The results are shown in Table 1. In Table 1, the loss factor (tan δ) of the pressure sensitive adhesive is indicated in the column of "Loss factor of adhesive (–)", and the peak temperature of the loss factor of the pressure sensitive adhesive is indicated in the column of "Peak temperature of loss factor of adhesive (° C.)". Table 1 shows that the pressure sensitive adhesive comprising the pressure sensitive adhesive composition A (acrylic pressure sensitive adhesive A) had a loss factor (tan δ) of 1.1 at 20° C. The temperature at the peak of the loss factor of the pressure sensitive adhesive (peak temperature of the loss factor) was 18° C.

EXAMPLE 2

The following substrate B was used as the substrate.

Substrate B: The substrate B was prepared by dry lamination bonding and included a poly(ethylene terephthalate) film layer (thickness: 9 μm)/aluminium foil (thickness: 50 μm)/a poly(ethylene terephthalate) film layer (thickness: 9 μm).

The following pressure sensitive adhesive composition B was used as the pressure sensitive adhesive.

Pressure sensitive adhesive composition B: In a three-neck flask, 10 parts by weight of acrylic acid and 90 parts by weight of 2-ethylhexyl acrylate as components, 0.1 part by weight of azobisisobutyronitrile as a polymerization initiator and 150 parts by weight of toluene as a polymerization solvent were placed, and the resulting mixture was stirred for 1 hour while introducing nitrogen gas into the flask. Thus, the inside atmosphere of the polymerization system was replaced with the nitrogen gas, the mixture was heated to 60° C. and was subjected to polymerization reaction for 7 hours. The resulting polymer had a weight average molecular weight of about 1000000. To 100 parts by weight of the solid content of the polymer, 2.7 parts by weight of an isocyanate cross-linking agent (available from Nippon Polyurethane Industry Co., Ltd., under the trade name of "Collonate L") as a cross-linking agent was added, was sufficiently stirred and thereby yielded the pressure sensitive adhesive composition B (acrylic pressure sensitive adhesive B).

The above-prepared pressure sensitive adhesive composition B (acrylic pressure sensitive adhesive B) was applied onto one side of the substrate B to a thickness of 25 μm, was heated in an oven at 130° C. for 3 minutes and thereby yielded a pressure sensitive adhesive layer. Subsequently, a release liner (release liner B) composed of a low density polyethylene (LDPE) film alone which did not undergo a treatment with a silicone release agent was affixed onto the surface of the pressure sensitive adhesive layer composed of the acrylic pressure sensitive adhesive B and thereby yielded a pressure sensitive adhesive sheet B carrying the substrate.

The backside of the substrate of the above-prepared pressure sensitive adhesive sheet B carrying the substrate was subjected to printing and thereby yielded a pressure sensitive adhesive label B.

The above-prepared pressure sensitive adhesive label B was applied onto the outer surface of a top cover of a commercially available 2.5-inch hard disk drive (b) so as to cover about 60% of the top cover and was subjected to measurement of a noise level in the same manner as in Example 1. The results are shown in Table 1. Table 1 shows that the noise level of 46.6 dB(A) before the application of the pressure sensitive adhesive label B according to Example 2 was reduced to 45.4 dB(A) after the application.

In addition, the loss factor (tan δ) and the peak temperature of the loss factor of the pressure sensitive adhesive were determined in the same manner as in Example 1. The results are shown in Table 1. Table 1 shows that the pressure sensitive adhesive comprising the pressure sensitive adhesive composition B (acrylic pressure sensitive adhesive B) had a loss factor (tan δ) of 0.8 at 20° C. The peak temperature of the loss factor of the pressure sensitive adhesive was 2° C.

EXAMPLE 3

The following substrate C was used as the substrate.

Substrate C: The substrate C was prepared by dry lamination bonding and included a white poly(ethylene terephthalate) film layer (thickness: 25 μm)/aluminium foil (thickness: 15 μm)/a poly(ethylene terephthalate) film layer (thickness: 9 μm).

The following pressure sensitive adhesive composition C was used as the pressure sensitive adhesive.

Pressure sensitive adhesive composition C: In a three-neck flask, 10 parts by weight of acrylic acid and 90 parts by weight of isononyl acrylate as components, and 0.1 part by weight of a photosensitive initiator (available from Ciba Geigy Ltd., under the trade name of "Irgacure 184") were placed, the resulting mixture was stirred for 1 hour while introducing the nitrogen gas into a reaction system, and the inside atmosphere of the reaction system was replaced with the nitrogen gas. Subsequently, the mixture was irradiated with ultraviolet rays from an ultraviolet lamp (UV lamp) to an exposure of about 150 mJ to perform a reaction with a polymerization rate of about 10%, and thereby yielded a prepolymer. To 100 parts by weight of the prepolymer, 0.14 part by weight of trimethylolpropane triacrylate (TMPTA) as an internal cross-linking agent and 1 part by weight of an isocyanate cross-linking agent (available from Nippon Polyurethane Industry Co., Ltd., under the trade name of "Collonate L") were added, the resulting mixture was stirred and thereby yielded a pressure sensitive adhesive composition C (an acrylic pressure sensitive adhesive C).

The above-prepared pressure sensitive adhesive composition C was applied to a thickness of 25 μm onto the surface of a silicone release agent layer, which was formed on a poly(ethylene terephthalate) film and thereby constituted a release liner C1. Onto the surface of the applied composition C, the silicone release agent layer of another release liner C2 (a similar release liner to the release liner C1) was affixed to cut off the surface of the composition from an airspace. Under this condition, the resulting laminate was irradiated with ultraviolet rays at an exposure of about 2000 mJ using an UV lamp from the release liner layer side, was allowed to react and thereby yielded an pressure sensitive adhesive sheet C. After peeling off (or removing) one of the two release liners (one of the release liner C1 and the release liner C2) from the pressure sensitive adhesive sheet C, the pressure sensitive adhesive layer composed of the acrylic pressure sensitive adhesive C was dried in an oven at 130° C. for about 1 minute to remove volatile components therefrom. The resulting laminate was then affixed onto the surface of the poly(ethylene terephthalate) film layer having a thickness of 9 μm of the substrate C and thereby yielded a pressure sensitive adhesive sheet C carrying the substrate.

The backside of the substrate of the above-prepared pressure sensitive adhesive sheet C carrying the substrate was subjected to printing and thereby yielded a pressure sensitive adhesive label C according to Example 3.

The above-prepared pressure sensitive adhesive label C was applied onto the outer surface of a top cover of a commercially available 2.5-inch hard disk drive (a) so as to cover about 56% of the top cover and was subjected to measurement of a noise level in the same manner as in Example 1. The results are shown in Table 1. Table 1 shows that the noise level of 27.7 dB(A) before the application of the pressure sensitive adhesive label C according to Example 3 was reduced to 26.4 dB(A) after the application.

In addition, the loss factor (tan δ) and the peak temperature of the loss factor of the pressure sensitive adhesive were determined in the same manner as in Example 1. The results are shown in Table 1. Table 1 shows that the pressure sensitive adhesive comprising the pressure sensitive adhesive composition C (acrylic pressure sensitive adhesive C) had a loss factor (tan δ) of 0.8 at 20° C. The peak temperature of the loss factor of the pressure sensitive adhesive was 2° C.

EXAMPLE 4

The following substrate D was used as the substrate.

Substrate D: The substrate D was prepared by dry lamination bonding and included a poly(ethylene terephthalate) film layer (thickness: 25 μm)/aluminium foil (thickness: 80 μm)/a poly(ethylene terephthalate) film layer (thickness: 25 μm).

The following pressure sensitive adhesive composition D was used as the pressure sensitive adhesive.

Pressure sensitive adhesive composition D: In a three-neck flask, 10 parts by weight of acrylic acid and 90 parts by weight of isononyl acrylate as components and 0.1 part by weight of a photosensitive initiator (available from Ciba Geigy Ltd., under the trade name of "Irgacure 184") were placed, and the resulting mixture was stirred for 1 hour while introducing nitrogen gas into a reaction system and the inside atmosphere of the reaction system was replaced with the nitrogen gas. Subsequently, the mixture was irradiated with ultraviolet rays from an UV lamp to an exposure of about 150 mJ to perform a reaction with a polymerization rate of about 10% and thereby yielded a prepolymer. To 100 parts by weight of the prepolymer, 0.2 part by weight of trimethylolpropane triacrylate (TMPTA) as an internal cross-linking agent was added, the resulting mixture was stirred and thereby yielded a pressure sensitive adhesive composition D (an acrylic pressure sensitive adhesive D).

The above-prepared pressure sensitive adhesive composition D was applied to a thickness of 50 μm onto the surface of a silicone release agent layer, which was formed on a poly(ethylene terephthalate) film and thereby constituted a release liner D1. Onto the surface of the applied composition D, the silicone release agent layer of another release liner D2 (a similar release liner to the release liner D1) was affixed to cut off the surface of the composition from an airspace. Under this condition, the resulting laminate was irradiated with ultraviolet rays at an exposure of about 2000 mJ using an UV lamp from the release liner layer side, was allowed to react and thereby yielded an pressure sensitive adhesive sheet D. After peeling off (or removing) one of the two release liners (one of the release liner D1 and the release liner D2) from the pressure sensitive adhesive sheet D, the pressure sensitive adhesive layer composed of the acrylic pressure sensitive adhesive D was dried in an oven at 130° C. for about 2 minute to remove volatile components therefrom. The resulting laminate was then affixed onto the surface of the poly(ethylene terephthalate) film layer having a thickness of 25 μm of the substrate D and thereby yielded a pressure sensitive adhesive sheet D carrying the substrate.

The backside of the substrate of the above-prepared pressure sensitive adhesive sheet D carrying the substrate was subjected to printing and thereby yielded a pressure sensitive adhesive label D according to Example 4.

The above-prepared pressure sensitive adhesive label D was applied onto the outer surface of a top cover of a commercially available 2.5-inch hard disk drive (c) so as to cover about 85% of the top cover and was subjected to measurement of a noise level in the same manner as in Example 1. The results are shown in Table 1. Table 1 shows that the noise level of 32.0 dB(A) before the application of the pressure sensitive adhesive label D according to Example 4 was reduced to 27.2 dB(A) after the application.

In addition, the loss factor (tan δ) and the peak temperature of the loss factor of the pressure sensitive adhesive were determined in the, same manner as in Example 1. The results are shown in Table 1. Table 1 shows that the pressure sensitive adhesive comprising the pressure sensitive adhesive composition D (acrylic pressure sensitive adhesive D) had a loss factor (tan δ) of 0.8 at 20° C. The peak temperature of the loss factor of the pressure sensitive adhesive was 2° C.

Comparative Example 1

A pressure sensitive adhesive label E was prepared in the same manner as in Example 3, except that the following substrate E was used as the laminated substrate.

Substrate E: The substrate E was prepared by dry lamination bonding and included a poly(ethylene terephthalate) film layer (thickness: 12 μm)/aluminium foil (thickness: 30 μm).

Specifically, the pressure-sensitive adhesive composition C was applied to a thickness of 25 μm onto the surface of a silicone release agent layer, which was formed on a poly(ethylene terephthalate) film and thereby constituted a release liner C1. Onto the surface of the applied composition C, the silicone release agent layer of another release liner C2 (a similar release liner to the release liner C1) was affixed to cut off the surface of the composition from an airspace. Under this condition, the resulting laminate was irradiated with ultraviolet rays at an exposure of about 2000 mJ using an UV lamp from the release liner layer side, was allowed to react and thereby yielded an pressure sensitive adhesive sheet C. After peeling off (or removing) one of the two release liners (one of the release liner C1 and the release liner C2) from the pressure sensitive adhesive sheet C, the pressure sensitive adhesive layer composed of the acrylic pressure sensitive adhesive C was dried in an oven at 130° C. for about 1 minute to remove volatile components therefrom. The resulting laminate was then affixed onto the surface of the aluminium foil of the substrate E and thereby yielded a pressure sensitive adhesive sheet E carrying the substrate. The backside of the substrate of the above-prepared pressure sensitive adhesive sheet E carrying the substrate was subjected to printing and thereby yielded a pressure sensitive adhesive label E according to Comparative Example 1.

The pressure sensitive adhesive label E according to Comparative Example 1 was curled and became rolled when the release liner was peeled off, and could not satisfactorily be affixed onto the top cover of a hard disk drive.

The measuring methods of the noise level and loss factor are as follows.

Measuring Method of Noise Level (Operation Noise)

Each of the pressure sensitive adhesive labels according to the examples was affixed onto the top cover of a hard disk drive, and the hard disk drive was powered on and was started, and the noise level under operation (operation noise) was determined by the following method.

The noise level was determined in an anechoic room. A testing stand was placed in the anechoic room, and a sample hard disk drive was placed on a sound-insulation foam rubber 20 mm thick in such a manner that the side, on which the pressure sensitive adhesive label was affixed, was up. The sound-insulation foam rubber was used to prevent a solid-borne sound of the testing stand due to propagated vibration of the hard disk drive and to insulate noise from the bottom of the hard disk drive.

The hard disk drive was started and was allowed to stand until the noise level became stable, and the noise level was then determined using a free sound field microphone placed 300 mm above the center position. The noise level was measured using A-weighting characteristics as a weighting network, was subjected to averaging for 20 seconds and was indicated as an overall in the range of frequencies of from 20 to 20000 Hz.

Measuring Method of Loss Factor

A plural plies of a sample pressure sensitive adhesive layer was affixed with each other to a thickness of about 1.5 mm and thereby yielded a test piece 7.9 mm in diameter. The test piece was subjected to measurement of shearing viscoelasticity at a frequency of 1 Hz using a dynamic viscoelasticity measurement system produced by Rheometrics Inc. The loss factor was determined in this procedure as tan $\delta$.

TABLE 1

|  | Example | | | |
| --- | --- | --- | --- | --- |
|  | 1 | 2 | 3 | 4 |
| Noise level before application of adhesive label [dB(A)] | 27.7 | 46.6 | 27.7 | 32.0 |
| Noise level after application of adhesive label [dB(A)] | 25.8 | 45.5 | 26.4 | 27.2 |
| Loss factor of adhesive (–) | 1.1 | 0.8 | 0.8 | 0.8 |
| Peak temperature of loss factor of adhesive (° C.) | 18 | 2 | 2 | 2 |

Table 1 shows that the pressure sensitive adhesive labels according to the examples can reduce 1 dB or more of the operation noise only by applying onto the position of the indicator label of the commercially available hard disk drive. Even if a release liner containing no silicone release agent is used, the pressure sensitive adhesive labels according to the examples do not curl, when the release liners are peeled off, and can satisfactorily be applied or affixed to the hard disk drive.

Industrial Applicability

As thus described above, the pressure sensitive adhesive label of the present invention can concurrently have satisfactory information indicating functions as a pressure sensitive adhesive label and the function of reducing the operation noise as a sound-insulating and vibration-damping material. It is therefore useful as a pressure sensitive adhesive member for a hard disk drive, which has two types of functions (effects) of the member as a pressure sensitive adhesive label and as a sound-insulating and vibration-damping material. The method using the pressure sensitive adhesive label of the present invention is useful for reducing noise caused by operation of a hard disk drive and can contribute to improve cost efficiency and operation efficiency. Such reduction of operation noise has become increasingly valued in recent years.

What is claimed is:

1. A pressure sensitive adhesive label for a hard disk drive, comprising a substrate, an information indicator formed on one side of the substrate, and a pressure sensitive adhesive layer formed on the other side of the substrate, wherein the substrate comprises a laminated substrate of a metal foil and a resin film layer, which resin film layer constitutes the backside of the pressure sensitive adhesive label and comprises a white colored resin film having the information indicator formed on the surface of the resin film by a thermal transfer printer, wherein the pressure sensitive adhesive label can reduce noise caused by operation of a hard disk drive by applying the label onto the outer surface of a housing of the hard disk drive.

2. A pressure sensitive adhesive label for a hard disk drive, comprising a substrate, an information indicator formed on one side of the substrate, and a pressure sensitive adhesive layer formed on the other side of the substrate, wherein the substrate comprises a metal foil and resin film layers laminated on both sides of the metal foil, one of which resin film layer constitutes the backside of the pressure sensitive adhesive label and comprises a white colored resin film having the information indicator formed on the surface of the resin film by a thermal transfer printer, wherein the pressure sensitive adhesive label can reduce noise caused by operation of a hard disk drive by applying the label onto the outer surface of a housing of the hard disk drive.

3. The pressure sensitive adhesive label for a hard disk drive according to claim 1 or claim 2, wherein the metal foil constituting the substrate has a thickness of equal to or more than 10 $\mu$m.

4. The pressure sensitive adhesive label for a hard disk drive according to claim 1 or claim 2, wherein the resin film layer formed on the backside of the pressure sensitive adhesive label has a thickness of from 25 $\mu$m to 125 $\mu$m inclusive.

5. The pressure sensitive adhesive label for a hard disk drive according to claim 1 or claim 2, wherein the resin film layers constituting the substrate are poly(ethylene terephthalate) films.

6. The pressure sensitive adhesive label for a hard disk drive according to claim 1, wherein a pressure sensitive adhesive constituting the pressure sensitive adhesive layer has a loss factor at 20° C. of from 0.5 to 2.0 inclusive.

7. The pressure sensitive adhesive label for a hard disk drive according to claim 1, wherein the pressure sensitive adhesive layer of the pressure sensitive adhesive label is protected by a release liner comprising no silicone release agent as a release agent.

8. The pressure sensitive adhesive label for a hard disk drive according to claim 3, wherein the resin film layer formed on the backside of the pressure sensitive adhesive label has a thickness of from 25 $\mu$m to 125 $\mu$m inclusive.

9. The pressure sensitive adhesive label for a hard disk drive according to claim 3, wherein the resin film layers constituting the substrate are poly(ethylene terephthalate) films.

10. The pressure sensitive adhesive label for a hard disk drive according to claim 4, wherein the resin film layers constituting the substrate are poly(ethylene terephthalate) films.

11. The pressure sensitive adhesive label for a hard disk drive according to claim 2, wherein the pressure sensitive adhesive is an acrylic polymer.

12. The pressure sensitive adhesive label for a hard disk drive according to claim 11, wherein the acrylic polymer is formed of monomers comprising (meth)acrylate containing an alkyl group having 4 to 14 carbon atoms.

13. A method of reducing noise caused by operation of a hard disk drive, the hard disk drive comprising a box-shaped housing main body for housing a recording disk platter and a top cover matching with the housing main body, the method comprising the step of applying the pressure sensitive adhesive label for a hard disk drive as claimed in claim 1 onto the outer surface of the top cover or of the housing main body of the hard disk drive.

14. A method of reducing noise caused by operation of a hard disk drive, the method comprising the step of applying the pressure sensitive adhesive label for a hard disk drive as claimed in claim 1 onto the outer surface of a top cover of a hard disk drive so as to cover 20% or more of the total area of the top cover.

15. A pressure sensitive adhesive label for a hard disk drive, comprising a substrate, an information indicator formed on one side of the substrate, and a pressure sensitive adhesive layer formed on the other side of the substrate, wherein the substrate comprises a metal foil and resin film layers laminated on both sides of the metal foil, wherein the pressure sensitive adhesive label can reduce noise caused by operation of a hard disk drive by applying the label onto the outer surface of a housing of the hard disk drive, and wherein the resin film layer constituting the substrate is at least one selected from the group consisting of poly(ethylene terephthalate) (PET), poly(butylene terephthalate) (PBT), polyimide (P1), polyethylene (PE), and polypropylene (PP).

* * * * *